United States Patent
Hill, III

(10) Patent No.: US 7,710,254 B1
(45) Date of Patent: May 4, 2010

(54) AUTOMATIC BRAKE LIGHT SAFETY SYSTEM

(76) Inventor: Joel H. Hill, III, 6633 E. Greenway Pkwy., Unit #3077, Scottsdale, AZ (US) 85254

( * ) Notice: Subject to any disclaimer, the term of this patent is extended or adjusted under 35 U.S.C. 154(b) by 356 days.

(21) Appl. No.: 11/810,102

(22) Filed: Jun. 5, 2007

(51) Int. Cl.
*B60Q 1/44* (2006.01)

(52) U.S. Cl. .................. 340/479; 340/467; 340/464

(58) Field of Classification Search ............. 340/479, 340/463, 464, 466–469, 461, 475, 487, 901
See application file for complete search history.

(56) References Cited

U.S. PATENT DOCUMENTS

| | | | |
|---|---|---|---|
| 4,758,931 A * | 7/1988 | Gabaldon | 362/503 |
| 4,916,431 A * | 4/1990 | Gearey | 340/479 |
| 6,099,151 A * | 8/2000 | Tlustos | 362/473 |
| 6,268,792 B1 | 7/2001 | Newton | |
| 6,710,709 B1 * | 3/2004 | Morin et al. | 340/468 |
| 6,753,769 B1 | 6/2004 | Elliott | |
| 6,888,452 B1 * | 5/2005 | Gerhaher | 340/479 |
| 7,002,459 B1 | 2/2006 | Escandon | |
| 7,019,632 B2 | 3/2006 | Cole | |
| 7,352,278 B2 * | 4/2008 | Terzian | 340/471 |
| 2003/0169165 A1 * | 9/2003 | Hall | 340/479 |
| 2004/0051635 A1 * | 3/2004 | Lu | 340/479 |
| 2005/0275193 A1 * | 12/2005 | Lee | 280/468 |
| 2006/0044128 A1 * | 3/2006 | Schweers | 340/464 |
| 2006/0125615 A1 * | 6/2006 | Song | 340/463 |
| 2008/0007180 A1 * | 1/2008 | Kesterson | 315/82 |

* cited by examiner

*Primary Examiner*—Benjamin C Lee
*Assistant Examiner*—Quang Pham
(74) *Attorney, Agent, or Firm*—Harpman & Harpman

(57) ABSTRACT

An integrated progressive brake light system for vehicles in which different sequences of brake lights are illuminated dependent on operator activation input. The brake light system uses a progressive multiple selective illumination in which additional central oriented brake lights are actuated as metered increase of operator input to indicate the relative degree of applied braking force as will be evident to the visual interpretation thereof.

7 Claims, 2 Drawing Sheets

AUTOMATIC BRAKE LIGHT SAFETY SYSTEM

BACKGROUND OF THE INVENTION

1. Technical Field

This device is related to vehicle stop lights that are positioned on the rear of the vehicle to indicate to following traffic when the vehicle is stopping.

2. Description of Prior Art

Prior art devices of this type have all been based on the accepted brake light system currently used on motor vehicles. Typically, two brake lights are positioned on the rear surface of the vehicle and are actuated once the driver applies any pressure to the brake pedal. They normally are illuminated jointly and at the same intensity as long as the user's foot remains on the brake pedal.

Alternate brake light systems have been developed in which multiple lights come on in different sequences depending on the relative braking effort or degree of deceleration that is occurring. Such systems have used different colored lights also to indicate the degree of braking, see for example U.S. Pat. Nos. 6,753,769, 6,268,792, 7,002,459 and 7,019,632.

In U.S. Pat. No. 6,753,769 a progressive slow stop signaling system is disclosed wherein a number of different colored light sets on a vehicle are illuminated to indicate relative speed of the vehicle at that time.

U.S. Pat. No. 6,268,792 claims a progressive brake light gauge using an accelerometer actuating a plurality of lamps in response thereto in all or separate sequence illumination.

U.S. Pat. No. 7,002,459 discloses a vehicle braking indicator that uses analysis of vehicle speed determined by engine revolution and progressive segment lighting associated therewith.

Finally, in U.S. Pat. No. 7,019,632 a vehicle braking light system is disclosed in which signal activation braking and intended braking of the driver by actuating a portion of the light display in association therewith.

SUMMARY OF THE INVENTION

A "light saver" braking light system of the invention that combines multiple brake lights in a multiple level orientation with progressive activation and illumination depending on the degree of braking that is taking place. The system imparts a unique visual indication by light position and illumination as to the degree and severity of the braking.

DETAILED DESCRIPTION OF THE INVENTION

Figure 1:
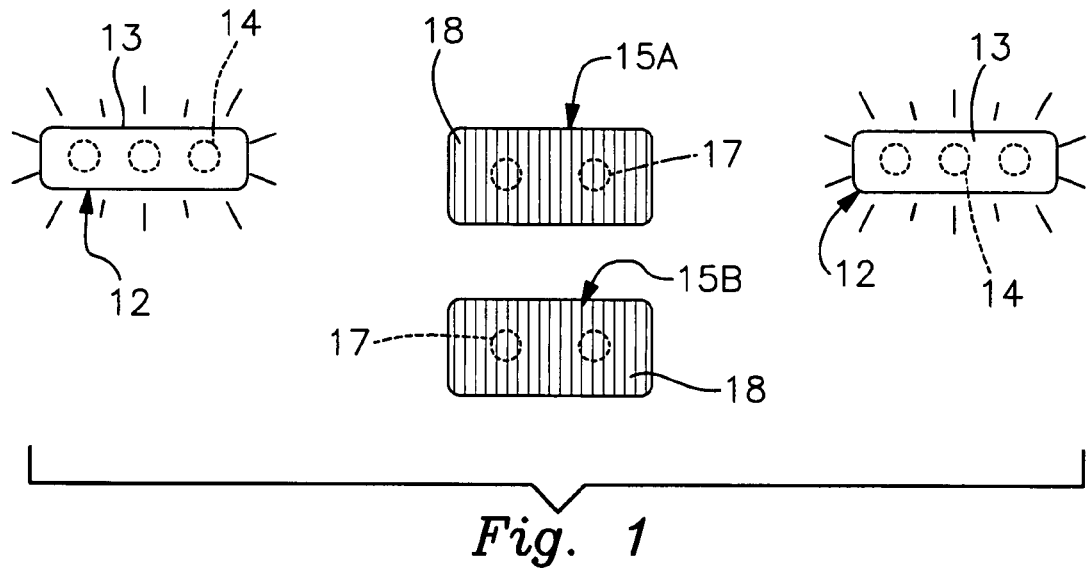
FIG. 1 is a graphic representation of the brake light system of the invention in light braking (easy activation).

Referring to FIG. 1 of the drawings, a brake light system 10 of the invention can be seen in which multiple individual brake lights generally referred to as 11 are illustrated in use position for representative purposes.

Figure 2:
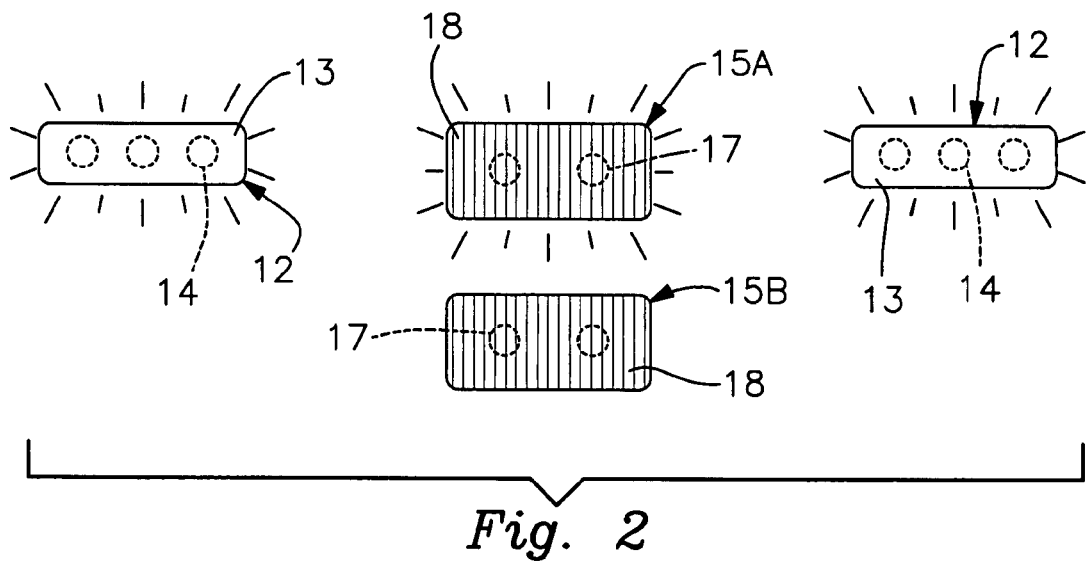
FIG. 2 is a graphic representation of the brake light system of the invention in normal braking activation.

A first pair of brake lights 12 can be seen as having a rectangular shape of equal size positioned in spaced horizontal relation to one another. Each of the brake lights 12 have a red semi-transparent lens 13 with a light source 14 positioned therein. A second pair of brake lights 15A and 15B of equal size being greater than that of hereinbefore described first pair of brake lights 12 are positioned in spaced vertical relation to one another midway between said first pair of brake lights 12, as best seen in FIG. 2 of the drawings. The brake light 15A is in longitudinal alignment with said respective brake lights 12 so as to form a multiple horizontal light array. Each of the brake lights 15A and 15B have corresponding red colored lens 16 with an independent light source 17 therewithin.

It will be evident to those skilled in the art that the light sources 14 and 17 can be of incandescent light bulbs or of an LED type, for example, that would be energized by an electric current supplied by the automobile's electrical system and be controlled, as noted by an electric control circuit responsive to operator brake activation input.

In operation, an electric control circuit is provided in which sequential illumination of the respective brake lights 12; 15A and 15B are achieved in the following operational examples.

Referring to FIG. 1 of the drawings a "light braking" (easy) illustration pattern is shown in which just the first brake light pair 14 is activated indicating to the following vehicle that braking is occurring in the subject vehicle.

Referring to FIG. 2 of the drawings a "normal braking" action is illustrated in which the primary brake lights 12 are illuminated with the addition of the enlarged brake light 15A therebetween indicating a normal braking venue is occurring.

Figure 3:
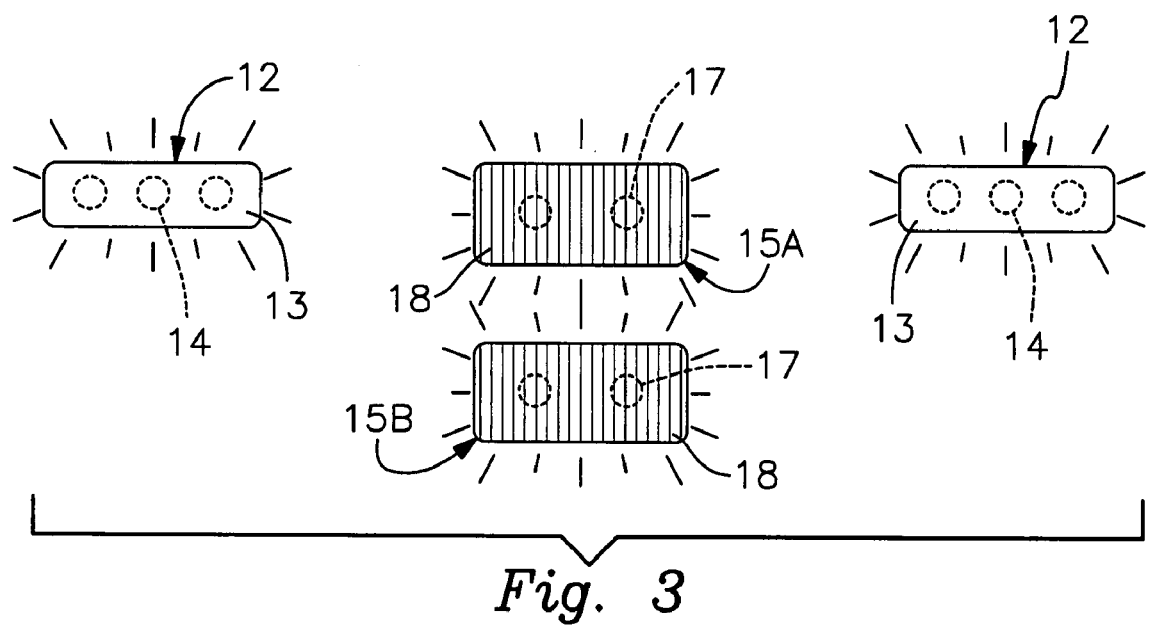
FIG. 3 is a graphic representation of the brake light system of the invention in emergency hard braking conditions.

Referring now to FIG. 3 of the drawings, an "extreme braking" (hard) is shown emergency in which both the brake light pairs 12 and 15A and 15B are activated with all at maximum equal intensity, thus alerting the following driver (not shown) that extreme, hard, emergency braking is taking place.

It will be seen that by providing multiple brake light sequence with additional brake lights of increased size positioned between smaller brake lights that distinct patterns can be achieved imparting a quick visual clue to the following driver that braking is taking place and the nature of that braking that is occurring. Such as an indication of all four lights being illuminated, as noted, would quickly alert the driver to rapid extreme hard braking occurring in the vehicle so equipped and give the operator of the following vehicle adequate time to respond. Again, normal braking would be indicated by three brake lights which form a distinct pattern over that of light braking in which the operator would perhaps simply place his or her foot on the brake pedal which is now indistinguishable in normal automotive braking light usage.

It will thus be seen that a new and novel multiple sequential braking system has been illustrated and described that imparts a visual, numerical and pattern orientation indication to alert the following driver to the various degrees of braking taking place, thus achieving a safer operator performance to avoid unwanted impacts and injuries.

It will be apparent to those skilled in the art that various changes and modifications may be made therein without departing from the spirit of the invention.

Therefore I claim:

1. An automatic sequential brake light system for vehicles wherein the system provides a brake light signal illumination sequence based on detected braking effort and comprises pairs of dissimilar sized brake lights in alternate illumination, comprising:
   a. activation of a pair of same size horizontally aligned spaced brake lights to indicate a first degree of braking effort;
   b. activation of a pair of same size brake lights and dissimilar size brake lights in a horizontal dependent orientation to said same size horizontally aligned space brake lights to indicate a second degree of braking effort greater than said first degree; and c. activation of both pairs of dissimilar sized brake lights in horizontal and vertical orientation simultaneously to indicate a third degree of braking effort greater than said second degree.

2. The automatic sequence brake light system set forth in claim 1 wherein feature "c" defines activation of pairs of dissimilar sized brake lights and wherein said similar size brake lights in vertical alignment are positioned between said brake light pairs of similar size in horizontal alignment.

3. The automatic sequence brake light system set forth in claim 1 wherein feature "c" further comprises said pairs of dissimilar sized brake lights are of horizontal orientation of a known size greater than that of said vertical orientation of a lesser size.

4. An automatic sequential braking light system as in claim 1, comprising:

multiple brake light illumination displays, means for detecting brake effort by an operator of the vehicle, wherein activation of selective groupings of brake lights depending on brake effort, wherein said multiple brake lights comprises independent pairs of similar size lights in horizontal and vertical orientation dependent of similar size wherein one of said brake lights is of dissimilar size in horizontal alignment between said remainder pair of similar size brake lights.

5. The automatic sequential braking light system set forth in claim 4 wherein said brake light illumination displays are formed of multiple lamps therewithin.

6. The automatic sequential braking light system set forth in claim 4 wherein said means for detecting brake effort comprises, an electronic control circuit responsive to operator brake activation input.

7. The automatic sequential braking light system set forth in claim 1 wherein said similar size light pairs are activated independently and in combination sequence depending of control means input in a predetermined sequence.

* * * * *